UNITED STATES PATENT OFFICE.

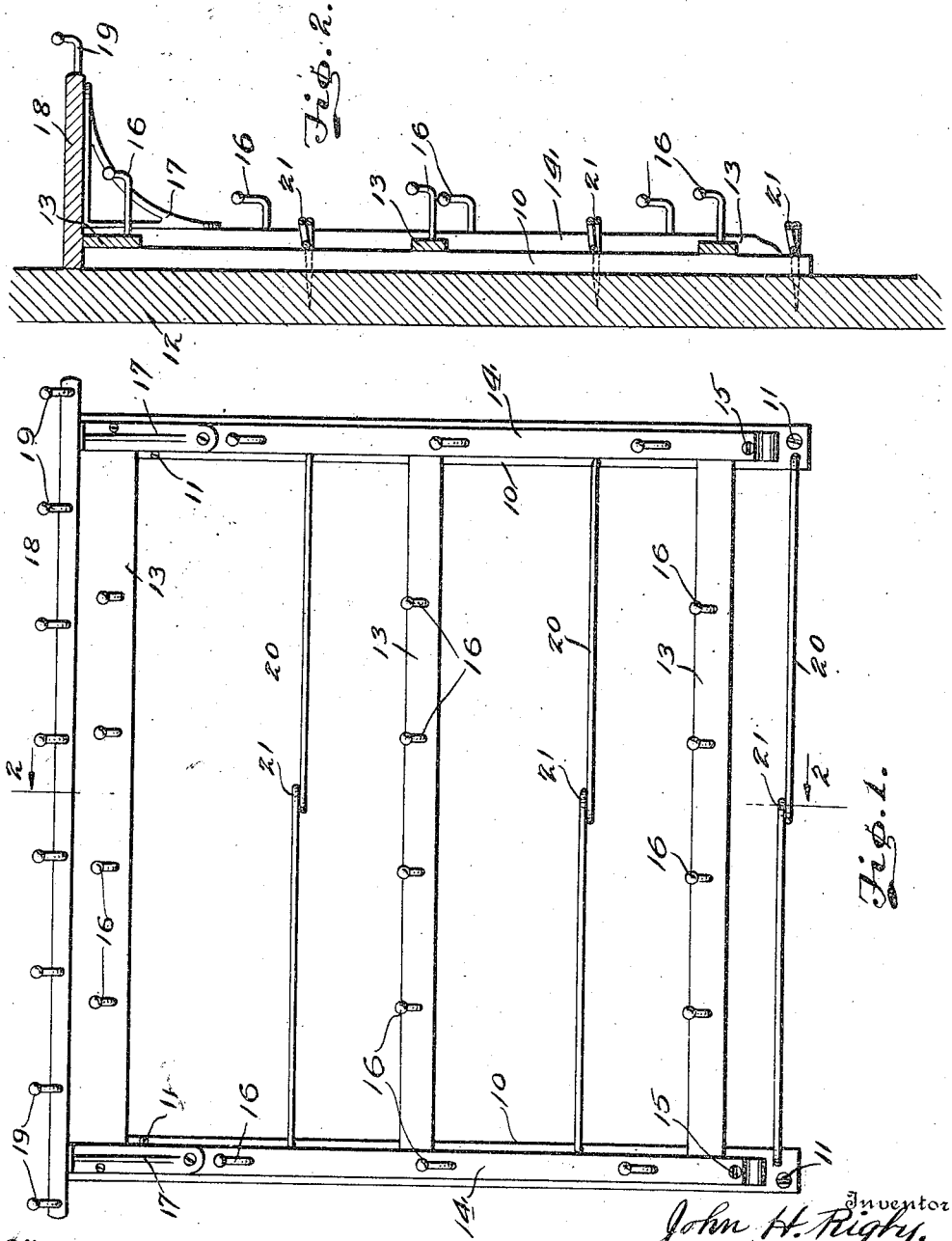

JOHN H. RIGBY, OF GLASS, TENNESSEE.

RACK.

1,191,468.    Specification of Letters Patent.    Patented July 18, 1916.

Application filed July 15, 1915. Serial No. 40,103.

*To all whom it may concern:*

Be it known that I, JOHN H. RIGBY, a citizen of the United States, residing at Glass, in the county of Obion and State of Tennessee, have invented certain new and useful Improvements in Racks, of which the following is a specification.

This invention relates to an improved rack and the principal object of the invention is to provide a rack which can be placed in a kitchen and used for holding cooking utensils such as pots and pans, the pots and pans being so held as to prevent them from coming in contact with the wall of the kitchen and soiling the wall.

Another object of the invention is to provide a rack which will be braced by the devices for preventing the pots and pans from engaging the wall of the kitchen.

Another object of the invention is to provide a rack which will be very easy and cheap to make and which will be very strong and durable and not liable to easily break or come to pieces.

This invention is illustrated in the accompanying drawings, wherein:—

Figure 1 is a view showing the improved rack in front elevation, and Fig. 2 is a view taken along the line 2—2 of Fig. 1.

The side bars 10 of this rack are provided with openings through which the screws or other fasteners 11 may pass to removably connect the rack with the wall 12 of the kitchen. The cross bars 13 have their end portions reduced and fitted into cutouts formed in the securing strips 14 fitting against the end bars 10 and secured thereto by means of screws or other fasteners 15. These cross bars and the securing strips 14 carry hooks 16 which are of the ordinary type used in connection with cupboard shelves, coat racks and the like. The brackets 17 which are secured to the upper ends of the securing strips 14 support the shelf 18 which serves as a support for dish covers or for any other purpose desired. Hooks 19 are provided so that pans may be hung from this shelf. It is desired to brace this rack and therefore the rods 20 have been provided, the rods having their end portions bent to form penetrating prongs driven into the side strips 10. It should be noted that if desired the ends of the bracing rods may be of sufficient length to pass entirely through the side bars and thus provide additional means for securing the rack to the wall. In order to give the bracing rods additional resiliency they are bent at points intermediate their length to form the springs 21. When in use this rack is secured to the kitchen wall as shown in the drawings and the pots and pans can be suspended from the various hooks. These pans would naturally have a tendency to swing in toward the wall and therefore the rods 20 have been provided. As the pans swing in toward the wall they will engage the rods and will thus be stopped in their inward movement and will be held in such a position that water dripping from the pots and pans will not fall upon the wall. It should be noted that a relatively heavy pan can be suspended from the hooks and even if permitted to strike the rods 20 violently these rocks will not be bent or broken since they are resilient and will thus take up the blow. They further serve as bracing means for holding the rack in the desired state and for preventing it from coming to pieces. A very strong and durable and serviceable rack has therefore been provided.

What is claimed is:—

A rack comprising side bars, cross bars extending between said side bars, supporting means carried by said cross bars, and resilient abutment rods extending beneath said cross bars and bent intermediate their length to provide spring elements and having their end portions connected with the side bars, said abutment rods constituting bracing means for the side bars to hold the same in tight engagement with said cross bars.

In testimony whereof I affix my signature in presence of two witnesses.

JOHN H. RIGBY.

Witnesses:
C. E. UPCHURCH,
W. B. GRISLAW.